United States Patent [19]

Patch

[11] 4,091,745
[45] May 30, 1978

[54] CROSS BAR END FITTING

[75] Inventor: Edward Patch, Dearborn Heights, Mich.

[73] Assignee: Evans Products Company, Portland, Oreg.

[21] Appl. No.: 666,082

[22] Filed: Mar. 11, 1976

[51] Int. Cl.² .......................... B60P 7/08; B60P 7/16; B61D 45/00; B61D 49/00
[52] U.S. Cl. ..................................... 105/498; 105/501
[58] Field of Search .............. 105/497, 498, 499, 500, 105/501

[56] References Cited
U.S. PATENT DOCUMENTS

| Re. 24,118 | 2/1956 | Fahland | 105/501 |
|---|---|---|---|
| 2,769,404 | 11/1956 | Dietrichson | 105/499 |
| 2,806,436 | 9/1957 | Johnston | 105/500 X |
| 2,896,554 | 7/1959 | Johnston | 105/501 |
| 3,071,086 | 1/1963 | Dunlap | 105/499 X |
| 3,130,690 | 4/1964 | Johnston | 105/498 |
| 3,952,671 | 4/1976 | Verde | 105/498 |

Primary Examiner—Drayton E. Hoffman
Assistant Examiner—Howard Beltran
Attorney, Agent, or Firm—Harness, Dickey & Pierce

[57] ABSTRACT

A universal type of end fitting for securing a freight bracing cross bar or the like, selectively to any of a plurality of different types of belt rails. The end fitting is comprised of a first pair of extending projections that are adapted to be alternatively supported on the upper edge of a belt rail leg or to extend through spaced apertures in a vertically extending belt rail leg. A pivoted latching hook is positioned between these projections. This hook is adapted to cooperate with a vertically extending belt rail portion to lock the cross bar against transverse movement relative to the belt rail. The hook also is adapted to extend through apertures in belt rail legs to prevent longitudinal movement. A sliding latch is provided that is adapted to extend through apertures in vertically extending belt rail legs to lock the cross bar against longitudinal movement.

17 Claims, 5 Drawing Figures

U. S. Patent
May 30, 1978
4,091,745
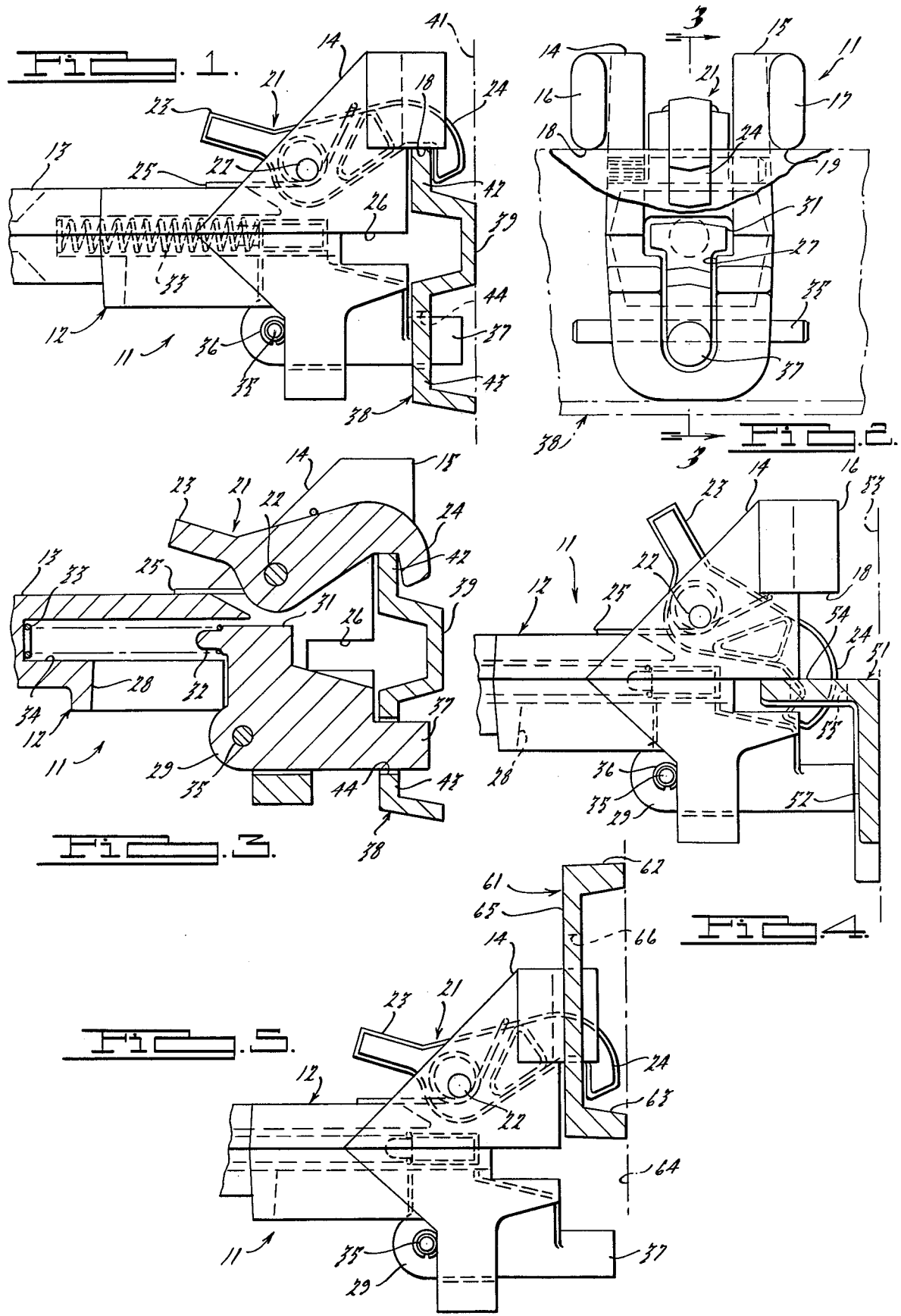

CROSS BAR END FITTING

BACKGROUND OF THE INVENTION

This invention relates to an end fitting for attaching a freight bracing cross bar or the like to a belt rail and more particularly to a universal end fitting that is cooperable with a plurality of different configuration of belt rails.

One normal method of bracing freight in transporting vehicles such as railroad cars, highway trailers or the like employs the use of a cross bar type of device. With a freight bracing cross bar, the side walls of the cargo area are equipped with a plurality of vertically spaced belt rails. Each of the belt rails is configured to provide longitudinally spaced attachment means whereby the cross bars may be affixed to the cargo area in preselected vertical and longitudinal locations. Various manufacturers have designed different configuration belt rails and, in some instances, the same manufacturer has designed different types of belt rails for different applications. It has been common to design a particular end fitting for use with a particular belt rail. This means that individual shippers must keep on hand an inventory of all types of cross bars to accommodate the various belt rails which may be employed in the transporting vehicles in which they ship goods. Such inventorying adds considerably to the cost and provides other disadvantages.

It has, therefore, been proposed to design a universal type of end fitting that may be used with a plurality of different types of belt rails. One such universal end fitting is disclosed in U.S. application Ser. No. 532,908 filed Dec. 16, 1974 entitled "End Fitting". This end fitting has advantages over other proposed universal type of end fittings in that it affords positive latching with each of the belt rails for which it is designed. However, this end fitting is only designed to be used with two different types of belt rails.

It is, therefore, a principle object of this invention to provide an improved end fitting that is usable with a wide variety of belt rails.

It is another object of this invention to provide a universal end fitting that affords positive latching with each type of belt rail that it is designed to cooperate with.

SUMMARY OF THE INVENTION

A first feature of this invention is adapted to be embodied in an end fitting for detachably interconnecting a cross bar or the like inerchangeably to a first type of belt rail having a horizontally disposed leg with longitudinally spaced openings or a second type of belt rail having a vertically upstanding portion and a portion formed with longitudinally spaced openings in a vertical face thereof. The end fitting has a first latch member movable relative to the end fitting between a latched position and a released position. This first latch member is comprised of at least one downwardly extending projection adapted to extend through the selective aperture in the first type of belt rail when in its latched position to fix the end fitting longitudinally and transversely to the first type of belt rail. A first part is adapted to underlie the horizontally disposed leg of the first type of belt rail for detachably affixing the end fitting against vertical movement relative to the first type of belt rail. The downwardly extending projection of the first latch member is adapted to extend behind the vertically upstanding projection of the second type of belt rail when the first latch member is in its latched position to fix the end fitting transversely to the second type of belt rail. A second part has a portion adapted to enter into a selective one of the apertures of the second type of belt rail for detachably affixing the end fitting against longitudinal and vertical movements relative to that type of belt rail.

Another feature of the invention is adapted to be used in an end fitting for attaching a freight bracing cross bar or the like interchangeably to different types of belt rails. In connection with this feature, a first projection is configured to enter selectively into an aperture in a vertically extending, apertured belt rail or to be supported upon the horizontally extending belt rail surface. A latch member is pivotal between a latched position and a released position. The latch member is adapted to extend behind an upstanding surface of belt rails in its latched position to prevent transverse separation therefrom.

BRIEF DESCRIPTION OF THE DRAWINGS

FIG. 1 is a side elevational view, with portions shown in section, of an end fitting embodying this invention and attached to a first type of belt rail.

FIG. 2 is an end view of the construction shown in FIG. 1, with portions broken away to more clearly show the construction.

FIG. 3 is a cross-sectional view taken along the lines 3—3 of FIG. 2.

FIG. 4 is a side elevational view, the portions broken away and similar to FIG. 1, showing the attachment of the end fitting to a different type of belt rail.

FIG. 5 is a side elevational view, with portions broken away and similar to FIGS. 1 and 4, showing the attachment to still another type of belt rail.

DETAILED DESCRIPTION OF THE PREFERRED EMBODIMENT

In the drawings a universal end fitting constructed in accordance with this invention is identified generally by the reference numeral 11. The end fitting 11 is adapted to be fixed in any known manner to a cross bar (not shown) or other similar bracing device. It is to be understood that one end fitting 11 is attached to each end of the cross bar or other bracing device.

The end fitting 11 has a main body portion, indicated generally by the reference 12, that terminates at one end in a shank 13 that affords the connection to the remainder of the cross bar. The main body portion 12 may be conveniently formed as a casting, forging or the like. The main body portion has a pair of spaced upwardly extending lugs 14 and 15. The lugs 14 and 15 have integrally connected to them respective forwardly extending projections 16 and 17 that are spaced apart a distance corresponding to the spacing of apertures in certain types of belt rails, as will become more apparent. The projections 16 and 17 also have lower supporting surfaces 18 and 19, respectively.

Positioned between the lugs 14 and 15 is a first latching member, indicated generally by the reference numeral 21. The first latching member 21 is pivotally supported on the main body portion 12 by means of a pivot pin 22. The inner end of the first latching member 21 has a handle portion 23 to permit pivotal movement of the latching member 21 between a latched position, as shown in each of the figures, and a released position. The latching member 21 has a forwardly extending hook-like portion 24. A torsional spring 25 engages the body portion 12 and latching member 21 to urge it to its latched positions.

Immediately beneath the lugs 14 and 15 the body portion 12 is formed with a recess 26, which is configured to pass with some clearance the horizontally extending leg of certain types of belt rails, as will become apparent. The portion of the body member 12 that defines the lower surface of the recess 26 is bifurcated, as at 27, to provide a clearance to receive the hook portion 24 of the first latching member 21.

Immediately below and behind the recess 26, the main body member 12 is formed with a central opening 28 in which a second latching member 29 is supported for sliding movement. The second latching member has a generally T-shaped portion 31 that terminates in a cylindrical projection 32. A coil compression spring 33 encircles the projection 32 and extends into a bore 34 formed in the main body portion 12 for urging the second latching member 29 to an engaged position. The limit of movement of this direction is controlled by a pin 35 that extends through the latching member 29 and is held in place by snap rings 36. The pin 35 also serves to function as a handle for sliding the second latching member 29 from its latched position to a released position. The second latching member 29 is completed by a forwardly extending latching pin portion 37.

FIGS. 1 through 3 of the drawings illustrate the end fitting 11 in conjunction with a type of belt rail sold by the assignee of this application under the trade name DF$_2$. Such a belt rail is identified generally by the reference numeral 38. The belt rail 38 is comprised of a first, vertically extending leg 39 that is adapted to be affixed to side wall 41 of the freight transporting vehicle. Extending upwardly and outwardly from the leg 39 is a second leg 42 which is spaced from the side wall 41. A third leg 43, which also extends vertically, is connected to the first leg 39 and extends below it. The leg 43 is also spaced transversely from the side wall 41. The leg 43 is formed with longitudinally spaced apertures 44.

FIGS. 1 thorugh 3 show the end fitting 11 affixed to the belt rail 38. When so affixed, the surfaces 18 and 19 of the projections 16 and 17 are supportingly engaged upon the upper end of the belt rail leg 42. The hook portion 24 of the first latching member 21 is positioned behind the leg 42 and prevents movement of the cross bar transversely relative to the belt rail 38. The pin portion 37 of the latching member 29 is engaged in a selected aperture 44 of the belt rail leg 43 so as to prevent longitudinal movement and so as to prevent vertical upward movement. The cross bar is supported vertically by the engagement of the surfaces 18 and 19 with the belt rail leg 42.

By sliding the latching member 29 to a released position through compression of the coil spring 33, the cross bar may be moved longitudinally along the belt rail 38 by the vertical support provided. The hook portion 24 will prevent transverse disengagement so that the cross bar may be slid to a new location. Alternatively, the cross bar may be lifted free of the belt rail 38 when the latch member 29 is released. To achieve this removal, it is not necessary to release the latch member 21.

The attachment of the end fitting 11 to the belt rail 38 is believed to be readily apparent. It need only be added that the latch member 21 need not be released when so attaching the end fitting 11 to the belt rail 38. The torsional spring 25 will pivot the latching member 21 in a clockwise direction from the position shown in FIGS. 1 and 3 to the position shown in FIG. 4. However, once the hook portion 24 contacts the leg 42 of the belt rail 38, the latch member 21 will be pivoted to the position shown in FIGS. 1 and 3 by this engagement.

FIG. 4 shows the end fitting 11 attached to another type of belt rail, also sold by the assignee of this invention. This type of belt rail is identified generally by the reference numeral 51 and is sold under the trade name DF. The DF belt rail 51 has a vertically extending leg 52 that is adapted to be affixed to the side wall 53 of the cargo carrying vehicle. A horizontally extending leg 54 is formed with longitudinally spaced apertures 55.

When connected to the belt rail 51, the leg 54 of the belt rail is passed into the recess 26. The portion of the body portion 12 which defines the recess 26 with the belt rail leg 54 provides vertical support, and prevent vertical disengagement. The hook portion 24 of the first latching member 21 is configured so as to selectively enter into one of the belt rail leg apertures 55 when in its latched position as shown in FIG. 4. This interengagement prevents longitudinal and transverse movement. To remove the end fitting 11, the latching member 21 is merely pivoted to a released position in a counterclockwise direction against the action of the torsional spring 25. The end fitting 11 and associated cross bar, thereby, may be moved to any selected longitudinal position wherein the latching member 21 may be reengaged. Alternatively, the end fitting 11 may be completely removed from the belt rail.

FIG. 5 shows the attachment of the end fitting 11 to a third type of belt rail, indicated generally by the reference numeral 61. The belt rail 61 has a generally channel shape with its short legs 62 and 63 affixed in any known manner to the cargo area side wall 64. The long, vertically extending leg 65 of the belt rail is formed with a plurality of longitudinally spaced apertures 66.

As has been noted, the spacing between the belt rail projections 16 and 17 is such that it coincides with spacing of multiple of the apertures 66. Therefore, the end fitting 11 is positioned in selected longitudinal locations by placing the projections 16 and 17 into appropriate of the apertures 66. This provides vertical support and prevents longitudinal movement. The locking member 21 is pivoted so that its hook portion 24 passes through an aperture 66 intermediate those engaged by the projections 16 and 17. The hook portion 24 lies behind the vertical leg 65 and, therefore, prevents transverse movement. To remove the end fitting 11 from the belt rail 61, the latch member 21 is pivoted to a released position by compression of the spring 25 and the projections 16 and 17 are withdrawn from the apertures 66. Attachment is achieved in the opposite mode.

From the foregoing description it should be readily apparent that the disclosed end fitting cooperates with a plurality of different types of belt rails to permit attachment. When used with each type of belt rail, positive assurance against longitudinal transverse and vertical movement is provided. A movable latching member prevents movement in at least one of these directions to insure positive interlock with convenient operation.

It is to be understood that the foregoing description is that of a preferred embodiment of the invention. Various changes and modifications may be made without departing from the spirit and scope of the invention as defined by the appended claims.

I claim:

1. An end fitting for detachably interconnecting a freight bracing member to a first type of belt rail having a horizontally disposed leg with longitudinally spaced openings and a second type of belt rail having a vertically upstanding portion and a portion formed with longitudinally spaced openings in a vertical face thereof below said upstanding portion, said end fitting having a first latch member movable relative to said end fitting between a latched position, an intermediate position and a released position, said first latch member being comprised of at least one downwardly extending projection adapted to extend through a selective aperture in the first type of belt rail when said first latch member is in its latched position to fix said end fitting longitudinally and tranversely to the first type of belt rail, said projection being spaced from the selected aperture in the first type of belt rail when said first latch member is in its released position, a first part being adapted to underlie the horizontally disposed leg of the first type of belt rail for detachably affixing said end fitting against vertical movement relative to the first type of belt rail, said downwardly extending projection of said first latch member being adapted to extend behind the vertically upstanding projection of the second type of belt rail when said first latch member is in its intermediate position to fix said end fitting transversely to the second type of belt rail, said downwardly extending projection being positioned above the vertically upstanding projection of the second type of belt rail when said first latch member is in its released position, and a second part having a portion adapted to enter into a selected one of the apertures of the second type of belt rail for detachably affixing said end fitting against longitudinal and vertical movement relative to said second type of belt rail.

2. An end fitting as set forth in claim 1 wherein the second part comprises a second latch member movable relative to the end fitting between a latched position and a released position.

3. An end fitting as set forth in claim 2 wherein one of the latch members is slidably supported between its latching position and its released position.

4. An end fitting as set forth in claim 2 wherein one of the latch members is pivotally supported for movement between its latched position and its released position.

5. An end fitting as set forth in claim 4 wherein the other latch member is slidably supported between its latched position and its released position.

6. An end fitting as set forth in claim 1 wherein the end fitting further includes a third part adapted to be supported upon the vertically upstanding portion of the second type of belt rail.

7. An end fitting as set forth in claim 6 wherein the third part is configured to enter into an aperture in a vertically extending leg of a third type of belt rail.

8. An end fitting as set forth in claim 7 wherein the second part comprises a second latch member movable relative to the end fitting between a latched position and a released position, one of said latch members being cooperable in its latched position with an aperture in the third type of belt rail to prevent transverse disengagement.

9. An end fitting as set forth in claim 8 wherein the one latch member comprises the first latch member.

10. An end fitting as set forth in claim 6 wherein the third part comprises a pair of spaced projections, the first latch member being pivotally supported between said projections.

11. An end fitting as set forth in claim 10 wherein the third part is configured to enter into an aperture in a vertically extending leg of a third type of belt rail.

12. An end fitting as set forth in claim 11 wherein the second part comprises a second latch member movable relative to the end fitting between a latched position and a released position, one of said latch members being cooperable in its latched position with an aperture in the third type of belt rail to prevent transverse disengagement.

13. An end fitting as set forth in claim 10 further including means defining a notched opening adapted to receive a horizontally extending leg of the first type of belt rail.

14. An end fitting as set forth in claim 13 wherein the second part comprises a second latch member movable relative to the end fitting between a latched position and a released position, said first latch member being pivotal between its positions, said second latch member being slidable between its positions.

15. An end fitting for attaching a freight bracing member interchangeably to different types of belt rails comprising a first projection configured to enter selectively into an aperture in a vertically extending, apertured belt rail of a first type of belt rail and to be supported upon a horizontal extending belt rail surface of a second type of belt rail, and a latch member pivotal between a latched position and a released position moving through an arc extending above and below said first projection, said latch member being adapted to extend behind an upstanding surface of each type of belt rails in its latched position to prevent transverse separation therefrom.

16. An end fitting as set forth in claim 15 further including a second projection spaced longitudinally from said first projection and configured to enter into selective apertures in the vertically extending, apertured belt rail or to be supported upon the horizontally extending belt rail surface.

17. An end fitting as set forth in claim 16 wherein the latch member is positioned between said projections.

* * * * *